United States Patent
Muller et al.

(10) Patent No.: US 10,233,798 B2
(45) Date of Patent: Mar. 19, 2019

(54) DEVICE FOR COOLING OIL FOR A TURBINE ENGINE

(71) Applicant: Snecma, Paris (FR)

(72) Inventors: Jean-Louis Muller, Moissy Cramayel (FR); Pierre Charles Mouton, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 238 days.

(21) Appl. No.: 14/904,206

(22) PCT Filed: Jul. 10, 2014

(86) PCT No.: PCT/FR2014/051775
§ 371 (c)(1),
(2) Date: Jan. 11, 2016

(87) PCT Pub. No.: WO2015/004394
PCT Pub. Date: Jan. 15, 2015

(65) Prior Publication Data
US 2016/0153326 A1    Jun. 2, 2016

(30) Foreign Application Priority Data

Jul. 12, 2013   (FR) .................... 13 56913

(51) Int. Cl.
*F02C 6/08*  (2006.01)
*F01M 5/00*  (2006.01)
(Continued)

(52) U.S. Cl.
CPC ............. *F01M 5/002* (2013.01); *F01D 25/12* (2013.01); *F01P 1/00* (2013.01); *F01P 11/12* (2013.01); *F02C 7/06* (2013.01); *F02C 7/14* (2013.01); *F05D 2210/13* (2013.01); *F05D 2260/601* (2013.01); *F05D 2260/609* (2013.01); *Y02T 50/671* (2013.01); *Y02T 50/675* (2013.01)

(58) Field of Classification Search
CPC .......... F01D 25/12; F01M 5/002; F01P 11/12; F01P 1/00; F02C 7/06; F02C 7/14; F05D 2210/13; F05D 2260/601; F05D 2260/609; Y02T 50/671; Y02T 50/675
See application file for complete search history.

(56) References Cited

U.S. PATENT DOCUMENTS 4,531,358 A * 7/1985 Smith ................. F01D 25/20
                                              184/6.11
5,320,196 A * 6/1994 Mouton ............... F01M 11/10
                                              184/104.1
(Continued)

FOREIGN PATENT DOCUMENTS

EP   1 496 302 A2   1/2005
FR   2 937 680 A1   4/2010
GB   2 093 373 A    9/1982

*Primary Examiner* — Jesse Bogue
(74) *Attorney, Agent, or Firm* — Blank Rome LLP

(57) ABSTRACT

The invention relates to a device (11) for cooling oil for a turbine engine, such as an aircraft turbojet or turboprop engine, characterized in that it comprises a duct (12) for circulating a flow of cold air ($F_1$), means (16) for injecting oil into the duct, and means (19) for extracting the oil mixed with the flow of cold air ($F_1$), located in the duct (12), downstream from the injection means (16).

6 Claims, 2 Drawing Sheets

(51) Int. Cl.
*F01D 25/12* (2006.01)
*F02C 7/06* (2006.01)
*F02C 7/14* (2006.01)
*F01P 1/00* (2006.01)
*F01P 11/12* (2006.01)

(56) References Cited

U.S. PATENT DOCUMENTS

| | | | | |
|---|---|---|---|---|
| 5,735,676 | A * | 4/1998 | Loos | F01D 25/18 184/104.1 |
| 8,375,917 | B1 * | 2/2013 | Neal | F01M 5/002 123/196 A |
| 8,915,991 | B2 * | 12/2014 | Foster | F01D 25/18 55/404 |
| 9,790,856 | B2 * | 10/2017 | Trohel | F04F 5/46 |
| 2005/0000753 | A1 * | 1/2005 | Sheridan | F01D 25/16 184/55.1 |
| 2005/0211093 | A1 | 9/2005 | Latulipe et al. | |
| 2013/0177398 | A1 * | 7/2013 | Dos Santos | F01D 11/04 415/116 |
| 2015/0252683 | A1 * | 9/2015 | Hasting | F01D 11/24 60/782 |

\* cited by examiner

DEVICE FOR COOLING OIL FOR A TURBINE ENGINE

The present invention relates to a device for cooling oil for a turbine engine, a turbine engine equipped with such a device and a method for cooling oil in a turbine engine.

In a turbine engine, various components and items of equipment (enclosures containing bearings, gearboxes, electrical machines, etc.) must be lubricated or cooled by means of an oil circuit, the heat generated generally being discharged to the oil circuit, by means of heat exchangers of the fuel/oil type and/or of the air/oil type.

Current turbine engines generate more and more heat, in particular because of the increased complexity of the transmission mechanisms (gearboxes) and very high dilution rates. As a result fuel/oil exchangers (FCOCs, standing for Fuel Cooled Oil Coolers) are saturated. This is because the flow rate of fuel is limited to the consumption of the turbine engine. In addition, the heating of the fuel must be limited so that it is not transformed into gum and blocks the fuel circuit, this heating being able to cause, in the worse cases, an initiation of fire in the turbine engine.

Current turbine engines thus require the use of air/oil exchangers (ACOCs, standing for Air Cooled Oil Coolers).

Exchangers of the ACOC type function by means of an air flow, forced or not, which is guided along a surface exchanging with an oil circuit. The air supply may be achieved for example by scooping or tapping of the air flow.

An ACOC exchanger may be of the surface type. In this case, it is generally in the form of a metal surface part allowing the passage of oil in ducts machined at its centre. Heat is extracted by means of fins in contact with a flow of cold air. To ensure high heat exchanges, such an exchanger must have a large surface area, and therefore also high mass and a large overall size.

There also exist ACOC exchangers of the "brick" type, which are relatively heavy exchangers, which disturb the flow of air and have a detrimental effect on the efficiency of the turbine engine.

The aim of the invention is in particular to afford a simple, effective and economical solution to these problems.

To this end, it proposes a device for cooling oil for a turbine engine, such as a turbojet or a turboprop aircraft engine, characterised in that it comprises a duct for circulation of a flow of cold air, means for injecting oil inside the duct, and means for extracting oil mixed with the cold air flow, situated in the duct, downstream of the injection means.

The invention therefore proposes mixing hot oil and cold air in order to obtain, by conduction, a homogeneous air/oil mixture in the duct, the temperature of which will be the equilibrium temperature of the mixture. This mixture is then treated by the oil extraction means so as to separate the oil from the air. The oil can thus return to the oil circuit of the turbine engine and the air can be discharged to atmosphere, in a ventilated enclosure or in a region of the turbine engine at lower pressure (secondary stream for example).

Preferably, the oil injection means comprise an injection nozzle able to atomise the oil so as to form droplets of oil of dimensions of between 1 and 5 µm.

The droplets of oil then have a large surface area for exchange with the cold air flow, which maximises the heat exchanges between them.

According to one feature of the invention, the device comprises a oil inlet conduit connected to the oil injection means and an oil extraction conduit connected to the oil extraction means, said oil inlet and extraction conduits being connected by a bypass conduit comprising a flap or valve able to open in the event of overpressure at the oil inlet conduit.

In this way, the flap or valve is able to open in the case of blocking of the injection means or when the oil is cold and has high viscosity. In these particular operating circumstances, the oil is not cooled by the cold air flow and is brought directly from the inlet conduit to the outlet conduit.

Advantageously, the oil extraction means comprise a rotary oil separator.

The structure and functioning of such an oil separator is known in particular from the document FR 2 937 680, in the name of the Applicant.

It should be noted that, in operation, a rotary oil separator does not always make it possible to extract all the oil present in the air/oil mixture. Such an oil separator has in fact its efficiency increased when its rotation speed increases and its efficiency decreases when the volume flow rate increases, since the droplets of oil present in the air/oil mixture are then small and more numerous. These fine droplets may have a tendency to follow the air streams despite the forces exerted on them by centrifugation and the inertia forces exerted when the rotary oil separator is functioning.

The efficiency of the oil separator may in particular be improved by:
an increase in the oil pressure in the duct at equal mass flow rate (reduction in the speed of the air and of the droplets, which improves the separation effected by centrifugal effect),
cooling of the air upstream of the oil injection means (increase in the temperature difference between the hot oil and the cold air),
a high rotation speed of the rotary oil separator.

Preferably, the duct is equipped with a turbine upstream of the oil injection means, the turbine comprising a shaft, intended to be rotated by the passage of the air flow through the turbine, and rotationally coupled to the rotary oil separator.

Such a feature makes it possible to drive the rotary oil separator at high speed, which has the effect of increasing its efficiency, as indicated previously.

Furthermore, the oil extraction means comprise a body made from metal foam. Such a body, which can be used or not in combination with a rotary oil separator, is for example known by the trade name Retimet and is described in the document US 2012/024723 in combination with a rotary oil separator.

This body makes it possible to create a sinuous circuit facilitating the contact of the oil droplets with the walls of the block, which makes it possible better to trap these droplets and thus to increase the efficiency of the extraction means. The use of such a block does however cause a high pressure drop, which it is necessary to take into account.

The invention also relates to a turbine engine such as an aircraft turbojet or turboprop engine, comprising, from upstream to downstream in the direction of flow of the gases, a fan, a low-pressure compressor, a high-pressure compressor, a combustion chamber, a high-pressure turbine, a low-pressure turbine, and a gas exhaust pipe, characterised in that it comprises an oil cooling device of the aforementioned type and means for taking off air in a zone situated downstream of the fan and upstream of the high-pressure compressor, able to supply the duct with cold air issuing from said zone.

The low-pressure compressor may be rotationally coupled to the low-pressure turbine by means of a first shaft, the high-pressure compressor being rotationally coupled to the high-pressure turbine by means of a second shaft coaxial with the first shaft and mounted inside the latter, the upstream end of the first shaft being equipped with a bearing situated in an enclosure, the air issuing from the duct emerging in said enclosure.

The discharge of the air, downstream of the extraction means, in such a chamber makes it possible to benefit from a second oil extraction pass, facilitating the grouping together of the droplets (increase in their size and trickling) by coalescence effect.

The invention finally relates to a method for cooling oil in a turbine engine, by means of a device of the aforementioned type, characterised in that it comprises the steps consisting of:

circulating a cold air flow inside the duct, injecting oil into said duct using injection means, so as to mix the oil and air and thus promote the cooling of the oil by the air, separating the oil from the air so as to extract the oil contained in said mixture, using the extraction means.

The invention will be better understood and other details, features and advantages of the invention will emerge from a reading of the following description given by way of non-limitative example with reference to the accompanying drawings, in which.

Figure 1:
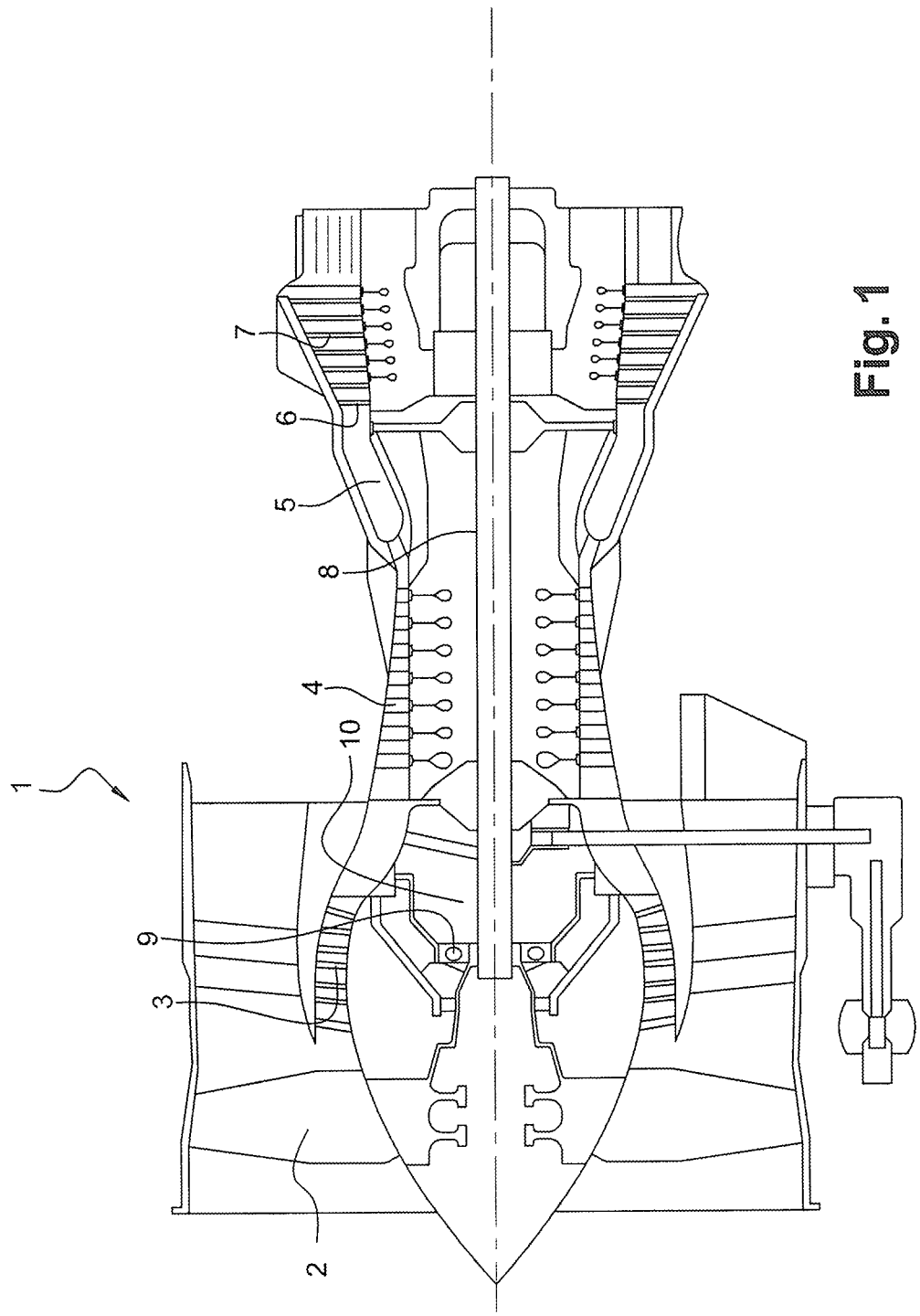
FIG. 1 is a view in axial section of a turbine engine of the prior art.

FIG. 1 depicts an aircraft turbine engine 1 of the prior art, comprising, from upstream to downstream in the direction of flow of the gases, a fan 2, a low-pressure compressor 3, a high-pressure compressor 4, a combustion chamber 5, a high-pressure turbine 6, a low-pressure turbine 7, and a gas exhaust pipe (not shown).

The low-pressure compressor 3 is rotationally coupled to the low-pressure turbine 7 by means of a first shaft 8, the high-pressure compressor 4 being rotationally coupled to the high-pressure turbine 6 by means of a second shaft (not shown) coaxial with the first shaft 8 and mounted inside the latter. The upstream end of the first shaft 8 is equipped with a bearing of the ball bearing type 9, situated in a ventilated enclosure 10.

As indicated previously, the various components and items of equipment of the turbine engine 1 must be lubricated or cooled by means of an oil circuit, the heat generated and transported by the oil being discharged by means of an oil cooling device.

Figure 2:
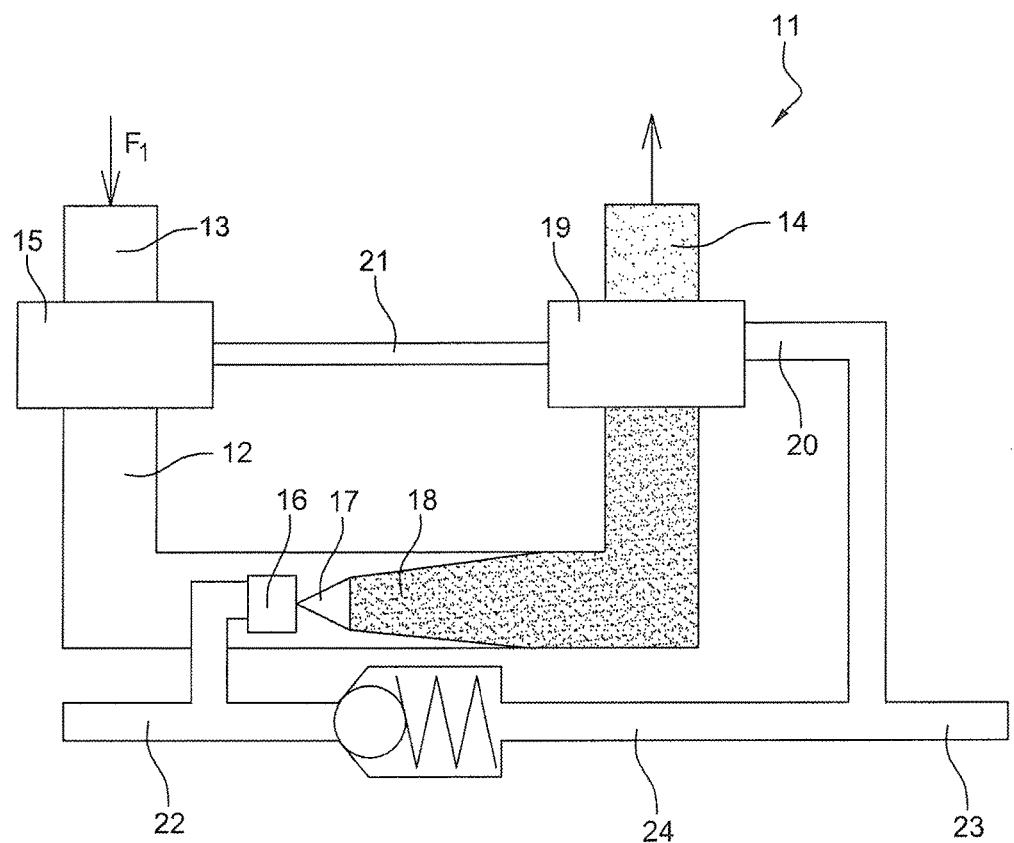
FIG. 2 is a schematic view of an oil cooling device of a turbine engine, in accordance with the invention.

FIG. 2 illustrates an oil cooling device 11 according to one embodiment of the invention, comprising a duct 12 for circulation of a cold air flow $F_1$. The upstream end 13 of the duct 12 is supplied with cold air by means for taking off air in a zone situated downstream of the fan 2 and upstream of the high-pressure compressor 4. The downstream end of the 14 of the pipe 12 emerges in the ventilated enclosure 10.

The duct 12 comprises, from upstream to downstream, in the direction of circulation of the cold air flow $F_1$, a turbine 15, an oil injection nozzle 16 able to atomise droplets of oil 17 in the duct and thus to form an air/oil mixture 18, and a rotary oil separator 19 able to separate the oil 20 from said mixture 18. The oil separator 19 is rotated by a shaft 21 driven by the turbine 15. The oil separator 19 may comprise a body made from metal foam in order to further improve its efficiency.

The device 11 according to the invention also comprises an oil inlet conduit 22 supplying the nozzle 16 and an oil extraction conduit 23 connected to the rotary oil separator 19, said oil inlet and extraction conduits 22, 23 being connected by a bypass conduit 24 comprising a non-return valve 25 or a valve able to open in the event of overpressure at the oil inlet conduit 22.

It should be noted that such a device may be contained in a single item of equipment without any kinematic connection with the rest of the turbine 1, which facilitates installation thereof.

The functioning of such a device 11 will now be described in detail.

Air is taken off in the zone situated downstream of the fan 2 and upstream of the high-pressure compressor 4. This air is then expanded by passing through the turbine 15. The latter drives the shaft 21 as well as the rotary oil separator 19. The nozzle 16 atomises fine droplets of oil 17, the dimensions of which are for example between 1 and 5 µm, in the air, so as to form a relatively homogeneous air/oil mixture 18. The oil droplets are then cooled by the air until they reach an exit temperature Ths theoretically equal to $$(Th)s=[(Th)e-(Ta)e)]/[(Da\cdot(cp)a+Dh\cdot cph], \text{ with:}$$

(Th)s: Oil exit temperature
(Th)e: Oil entry temperature
(Ta)e: Air entry temperature
Da: Mass flow rate of air
(cp)a: Specific heat of the air
Dh: Mass flow rate of oil
(cp)h: Specific heat of the oil.

A major part of the oil 20 is then extracted to the extraction conduit 23, by means of the rotary oil separator 19. A small part of the oil is however carried away with the air flow to the enclosure 10, where the oil can benefit from a second extraction pass, facilitating the grouping together of the droplets (increase in their size and trickling) by coalescence effect.

Such a device 11 therefore makes it possible to effectively cool the oil used for the lubrication of the various components of the turbine engine 1 and also has relatively low mass and overall size, having regard to its performances.

The invention claimed is:

1. An oil cooling device for a turbine engine, the oil cooling device comprising:
    a duct for circulation of an air flow;
    means for injecting oil inside the duct; and
    means for extracting oil mixed with the air flow, situated in the duct, downstream of the injection means,
    wherein the air flow has a temperature cooler than the oil,
    wherein the means for extracting oil comprise a rotary oil separator, and
    wherein the duct is equipped with a turbine upstream of the means for injecting oil, the turbine comprising a shaft intended to be rotated by passage of the air flow through the turbine and rotationally coupled to the rotary oil separator.

2. The oil cooling device according to claim 1, wherein the means for injecting oil comprise an injection nozzle able to atomise the oil so as to form droplets of oil with dimensions between 1 and 5 µm.

3. The oil cooling device according to claim 1, further comprising an oil inlet conduit connected to the means for injecting oil and an oil extraction conduit connected to the means for extracting oil, said oil inlet and extraction conduits being connected by a bypass conduit comprising at least one of a flap and a valve able to open in an event of overpressure at the oil inlet conduit.

4. The oil cooling device according to claim 1, wherein the means for extracting oil comprise a body made from metal foam.

5. A method for cooling oil in a turbine engine, by means of a device according to claim 1, comprising the steps of:
- circulating the air flow inside the duct,
- injecting oil into said duct using said means for injecting oil, so as to mix the oil and air and thus promote the cooling of the oil by the air, and
- separating the oil from the air so as to extract the oil contained in said mixture, using the means for extracting oil.

6. A turbine engine comprising, from upstream to downstream in a direction of flow of gases:
- a fan;
- a low-pressure compressor;
- a high-pressure compressor;
- a combustion chamber;
- a high-pressure turbine;
- a low-pressure turbine; and
- a gas exhaust pipe;
- an oil cooling device comprising a duct for circulation of an air flow, means for injecting oil inside the duct, and means for extracting oil mixed with the air flow, situated in the duct, downstream of the means for injecting oil; and
- means for taking of air in a zone situated downstream of the fan and upstream of the high-pressure compressor, able to supply the gas exhaust pipe with air issuing from said zone, wherein the air has a temperature cooler than the oil, and
wherein the low-pressure compressor is rotationally coupled to the low-pressure turbine by means of a first shaft, the high-pressure compressor being rotationally coupled to the high-pressure turbine by means of a second shaft coaxial with the first shaft and mounted inside the latter, the upstream end of the first shaft being equipped with a bearing situated in an enclosure, the air issuing from the duct emerging in said enclosure.

* * * * *